Figure 1:
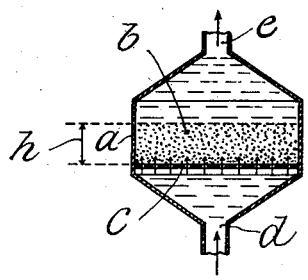

Feb. 16, 1926.

I. ISAACHSEN

SUSPENSION VESSEL

Filed July 3, 1924

Inventor:
Isak Isaachsen,
By Byrnes, Townsend & Brickenstein,
Attorneys.

Patented Feb. 16, 1926.

1,573,716

UNITED STATES PATENT OFFICE.

ISAK ISAACHSEN, OF CHRISTIANIA, NORWAY, ASSIGNOR TO A/S KRYSTAL, OF CHRISTIANIA, NORWAY.

SUSPENSION.VESSEL.

Application filed July 3, 1924. Serial No. 724,156.

*To all whom it may concern:*

Be it known that I, ISAK ISAACHSEN, a subject of the King of Norway, residing at Uranienborgveien 26, Christiania, Norway, have invented certain new and useful Improvements in Suspension Vessels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In a number of industries apparatuses are used, in which a stream of liquid is driven in an upward direction through a layer of some kind of granulated material, in order, for example, to dissolve or lixiviate the same or in order to cause development of large crystals.

In apparatuses of this type the best effect is obtained when the flow of liquid is evenly distributed and the granules are suspended in a continuous relative movement. But up to the present no arrangements have been known which satisfy these conditions. In a stream of liquid it is very difficult to keep in suspension a collection of comparatively big granules specifically heavier than the liquid, owing to the fact that the conditions are typically labile. In all known suspension apparatuses there is therefore obtained a state where the current at some places is too weak, so that the granules lie undisturbed on each other, while in other places the current is far too strong.

At the dead places the liquid is not changed quickly enough on all parts of the granule surfaces. In dissolving vessels the granules are therefore slowly dissolved, and insoluble parts are not washed away, so that the liquid can gain free access to the soluble particles. In crystallization vessels the crystals in these dead places tend to grow together.

In places where there is a strong current, practically the whole amount of the liquid passes through the layer with an energy which is proportional to the square of the velocity. The following example shows that the utilization of the energy of this liquid quantity to maintain granules in suspension in the liquid, is very irrational.

If, for instance, a collection of salt-granules is to be suspended in a brine with a specific gravity of 1.2, it is well known to perform this by conducting a stream of brine upwards through the bottom of a conical hopper-shaped vessel. If the flow has a cross section for instance of 1 dm² (15 sq. inches) and a velocity of 1 m/sec., this liquid as it spreads in the suspension hopper, thereby gradually losing its velocity to nearly zero in accordance with the impulse-theorem, may carry a maximum weight:

$G = (12:9.8).1 = 1.225$ kg., as through 1 dm² there passes 12 kg. brine per second, i. e. $(12:9.8)$ mass units with an impulse or momentum (i. e. product of mass into velocity) equal to $(12:9.8).1$.

As however, this momentum is not only utilized for moving granules of salt, but also for moving the brine, it is impossible by means of this momentum to maintain in suspension more than about 1 kg. salt, although the salt owing to the buoyancy is lighter in the brine than in air.

In most cases this represents only a very small fraction of what is required for utilizing an amount of brine corresponding to 12 kg. per second, whether the object is solution or precipitation. If there is placed a larger amount of salt than 1 kg. in the suspension space (generally many times more has been used hitherto), the current forces its way by making a hole through the body of salt, maintaining approximately 1 kg. of salt in suspension, while the rest of the salt remains as a compact body on the bottom. The efficiency of the arrangement as a means for causing a rapid solution or growth of crystals is therefore very small, whereas the above mentioned drawbacks are in fact considerable.

For a long time attempts have been made to find means to maintain a much larger quantity in suspension.

The only means for this object which has been suggested up to the present is to place a layer of the granulated material on a metal netting, a perforated plate or a bottom similar to a Venetian blind, and drive the brine through the same with a large cross sectional area and a low velocity.

This, however, was only a very small improvement. Instead of passing uniformly distributed through the comparatively thick layer of material, the stream of liquid will tend to work out a number of holes or "springs" in the same, so that practically the whole amount of liquid will pass through the layer in a number of separate jets in the same manner as above described for one single jet. In each spring a very small amount of material will be in suspension, while the rest of the material remains undisturbed on the bottom with no considerable quantities of liquid passing therethrough and without the necessary relative movement between the granules being caused. In a crystallization vessel the crystals will therefore tend to grow together.

The present invention has for its object the use of a static liquid pressure for maintaining the granulated material in suspension instead of using—as previously—the "impulse" of momentum of the stream of liquid.

If a cylindrical vessel with vertical axis, through which flows a steam of liquid, is filled to a certain height with a granulated material consisting of for instance spherical granules, the free cross sectional area between the granules when resting upon each other will be approximately $\frac{1}{10}$ of the total cross sectional area of the vessel. The velocity of the liquid in this cross sectional area will therefore be approximately 10 times as large as when no granules are present, and the suspending power of the liquid is accordingly approximately 100 times as large.

This suspending power is obtained exclusively in the form of static pressure differences between the different layers of material so long as the individual granules are not far removed from each other. As the deflections to which the flow of liquid is exposed by passing in thin streams between the granules take place as often from the vertical to the horizontal direction of flow as from the horizontal to the vertical direction, and as the variations in velocity are as often negative as positive, it is not the original momentum of the stream of liquid which lifts the material. On the contrary, the liquid leaves the layer of material with the same velocity and in the same direction of flow as when it enters.

On the drawing there is diagrammatically illustrated how this principle is utilized according to the present invention.

Fig. 1 illustrates diagrammatically the simplest form of the invention.

In a vessel $a$ is placed a layer $b$ of a granulated material on a perforated plate $c$. The liquid enters at $d$ and leaves at $e$.

The new feature of the invention now consists therein that the total cross section of all perforations in plate $c$ is held intentionally less in relation to the cross section of the suspension vessel than is the case in the arrangements hitherto known. The perforations are made in such a manner that $$S < \frac{F}{5 - \frac{b}{l} + \frac{a-3}{7}}$$

wherein $b$ is the average width, $l$ is the average length of the perforations, measured where the perforations have the smallest cross sectional area, and $a$ is the average distance between the perforations in cm. F is the largest cross sectional area of the suspension vessel perpendicular to the current direction, and S is the cross sectional area of a circular hole with well rounded edges, giving the same resistance to flowing through it as the perforations of the bottom. The distance $a$ is measured at holes from centre of gravity to centre of gravity of the cross sections, in case of lengthy apertures from longitudinal axis to longitudinal axis.

So small cross sections S have never existed in any suspension vessel bottoms hitherto known. Because, when in the arrangements hitherto known material remained undisturbed on the bottom between the holes, it was no obvious thought—on the contrary, it was very paradoxical—that this fault should be removed by making the bottom areas between the holes still larger, which is the chief characteristic of the present invention.

By means of this exceedingly simple means viz: reducing the cross section of the holes of the suspension bottom, the main cause for the above mentioned great drawbacks in the known suspension vessels is removed, and in spite of the very simple solution of the problem, a principally different condition is obtained by means thereof.

When the layer of material is resting on a wire screen or a usual perforated plate with a large total hole area as previously known and holes or springs are formed through the layer of material as before mentioned, through which holes or springs the main part of the liquid passes, the reason for this liability is to be found in the fact that the resistance in the springs is far smaller than in the compact parts of the layer. However, by making the total cross section of all holes in plate $c$ as small as just mentioned, the stream of liquid will meet a comparatively large resistance before entering the layer of material. Thus, even if a transient formation of springs should commence in the layer of material, the decrease in resistance caused thereby is comparatively much smaller, because the large resistance of the perforated screen is not reduced thereby. A large amount of the liquid is therefore prevented from flowing through the springs, but will still have to pass through other parts of the material layer, the more so because an increase of velocity through the perforations below a spring in the layer of material will cause an increase in the resistance of these perforations proportionally with the square of the velocity.

The main part of the liability is thereby removed. The small remainder of liability is removed because of the fact that the liquid from several perforations cannot collect in one spring, except by flowing in horizontal direction. The horizontal currents through the layer of material will displace the granules, because now they are not lying directly upon each other, but are easily movable and will thereby again fill up the springs. The statical head or pressure in the layer of material will therefore be maintained in a stable condition owing to the fact that in no places streams of liquid are allowed to pass through the layer of material which are sufficiently strong to remove the granules far from each other, or sufficiently small to permit the granules to lie at rest closely together.

In the arrangements previously known this was not obtained, and the statical pressure in the same occurred only at intervals and under labile conditions, so that in fact it was always the dissatisfactory "impulse condition" which existed in these apparatuses.

That the present invention is of great importance to the industry, will be understood from the following experiments:

From sea-water-brine 170 kg. salt were crystallized during 12 hours by means of a statically suspended amount of salt, which required to be constantly only 150 kg. in maximum. This was obtained by passing a circulating amount of brine of 12 1/s (supersaturated by evaporation outside the suspension) through the suspension against a resistance of about 300 mm. brine column, thus with a theoretical amount of work of only 1/15 horsepower. The cross sectional area of the crystallization vessel was only 0.35 square meter.

This is an intensity and a cheapness of the crystallization which lie far above everything hitherto known, and which is obtained by the exceedingly rational utilization of the surfaces of the suspended granules.

The peculiar form of the above formula for the total sum S of the hole cross sectional area has its reason in the following:

S does not represent the sum of the cross sections of the real holes but that of an equivalent "well rounded hole". For, as has been explained above, the reduction of the cross-section-sum has for its principal purpose to produce a resistance, and this resistance may be different for a given hole area. It depends upon whether the hole edges are rounded or sharp, whether the holes are cylindrical or conically diverging, whether the currents towards the holes are retarded by centrifugal forces or not, etc., thus a normal hole shape must be a base for the formula.

If the suspension space is not cylindrical, but for instance tapered, F must be represented in the formula by the largest sectional area of the suspension space, because this section, if located at a high level, determines the greatest amount of liquid that can be passed through the apparatus without the current taking along with it out of the space granules of material of a given size, and if the section is located at a lower level, it will determine the suspending action of the current.

Sometimes it may be advantageous to make the several holes in the bottom plate with a different shape or different dimensions. In such case $b$ means the arithmetic average of the least width of all hole sections, and 1 means the arithmetic average of the greatest length of all hole sections measured in the narrowest section of the holes, if they, for instance, widen conically upwards.

The reduction of the effective sum of the hole areas in itself has a regulating, stabilizing effect as compared with the arrangements formerly known, as will appear from the above. However, the arrangement illustrated on Fig. 1 may still be improved. For practical reasons, it is often desirable that the diameter of the separate holes in plate $c$ is kept comparatively big in order to prevent clogging of the holes, and the consequence of this large diameter is that the holes have to be located at a comparatively great distance from each other in order to maintain a small total area as above mentioned. With certain materials this may again have the effect of establishing a tendency to formation of springs, and local strong currents may act to break up crystals.

This drawback may be reduced in a known manner by causing the whole suspended mass of materials to rotate, so that the jets of liquid from the plate perforations continuously are caused to act on new parts of the material, so that no formation of springs is possible. The rotary movement may be brought about either by means of stirring devices or by giving the perforations in plate $c$ an inclined axis, so that the jets have a tangential as well as an axial component of movement.

Instead of a tangential movement in a cylindrical vessel it is also possible by inclining the openings to effect radial or a combination of radial and tangential movements in order to prevent the material from collecting mostly at the circumference of the vessel owing to the centrifugal action.

It is well known to cause a rotation of the material by conducting the liquid into the vessel through a jalousie-shaped bottom. If, however, this means is not combined with the reduction of the perforated cross section as above referred to, it is not able to remove the drawbacks described. For if such large amounts of liquid are passed through the openings that their momentum is sufficient to effect horizontal movements of the layer of material all over in spite of its friction against the bottom and walls, the currents will remove suspended granules from the vessel, and if smaller amounts of liquid are passed through, there are formed dead places in the layer of material.

If, however, jalousie-shaped bottoms or inclined holes are used in connection with the new principle above described, the tendency to formation of springs is so small that the mass of material practically everywhere in the cross section of the vessel is maintained in suspension, having therefore a very small friction against the bottom so that a small impulse is sufficient to cause horizontal movements.

Figure 2:
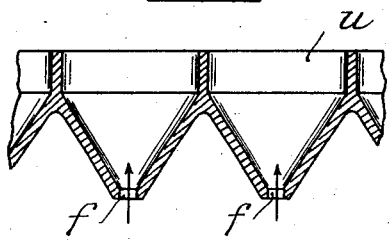

Another way of removing a tendency to formation of springs is indicated on Fig. 2 which illustrates part of a bottom plate for a suspension vessel. The holes $f$ diverge rapidly in an upward direction, so that the jets leave the bottom plate and enter the layer of material above it with a much reduced velocity. A great proportion of the dynamic vertical impulse of each jet is thereby absorbed by the tapered walls of the hole itself.

The cross section of these diverging holes may be circular or polygonal. The main thing is that the diverging is so rapid that the transformation of motion into pressure takes place with bad efficiency. If this was not the case, the resistance against the current would be reduced.

The diverging has to be rapid but not sudden, partly because a rapid diverging gives a higher resistance than a sudden one and partly because a sudden diverging results in dead spaces, wherein granules may come at rest.

In an arrangement according to Figure 2 it happens that the granular material falls down in the spaces or compartments $u$ on account of downwardly directed currents near the walls in these spaces. In the case of crystals they may be easily broken asunder by the intensive local currents in the funnel-like openings.

Figure 3:
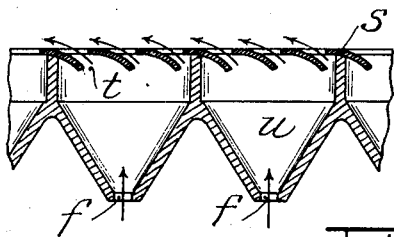

This drawback may, as is well-known, be avoided by a correct shaping of the diverging parts of the hopper, or an arrangement as shown in Figure 3 may be used.

Each hole $f$ in this form of the invention diverges rapidly upwards. In order to prevent the granular material from falling into the hoppers, there is used a plate $s$ which is provided above each hopper opening with openings $t$ like those in a Venetian blind. These openings may be so large that the velocity of the liquid through the same is considerably smaller than in $f$ and also nearly horizontal so that its tendency to form springs is practically non-existant.

Instead of making plate $s$ with openings $t$, there may also be used a metal wire screen or an ordinary perforated plate when either the holes are so small or the speed in the holes so high that the granular material does not drop through the same.

Figure 4:
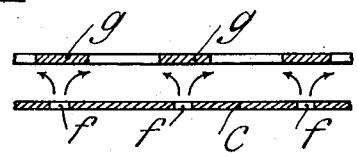
Figure 5:
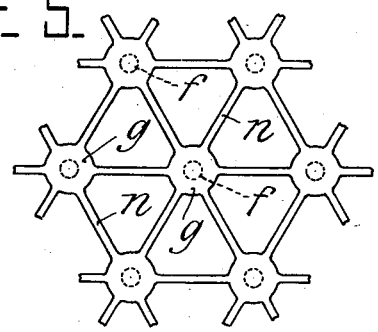

Figs. 4 and 5 illustrate still another construction. Above each hole $f$ in plate $c$ is fastened a small plate $g$ which transforms the vertical velocity of the jets into horizontal velocities. Plates $g$ may be retained by means of ribs $n$, which interconnect the same to a screen over the bottom $c$.

As the jets in this manner are caused to take a horizontal direction, their vertical impulse is taken up by means of the plates $g$ instead of causing springs in the layer of material, and the kinetic energy of the horizontal currents destroyed under mutual extinguishing of all horizontal impulses.

Figure 6:
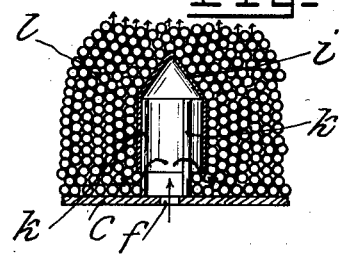
Figure 7:
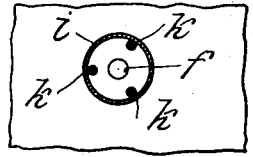

The vertical impulse of the jets may also be taken up and their kinetic energy destroyed by means of an arrangement as illustrated in Figs. 6 and 7.

Over each hole $f$ there is fastened a hood $i$ hanging on three metal pins $k$; the kinetic energy of the jets is destroyed completely by eddy currents in the interior of the hood, so that the horizontal velocity with which the liquid leaves the hood is comparatively very small.

In order to obtain the small total cross-sectional area of all holes and the corresponding great resistance to the current of liquid as set forth in claim 1 hereinafter, the perforated bottom may also be provided with small spheres or granules 1 (see Fig. 6) of an insoluble material which is specifically heavier than the liquid, in combination or not with hoods $i$, said spheres being prevented from sinking by the perforated bottom $c$.

Also in the example illustrated in Figs. 2, 3, 4 and 5, such a layer of spheres or balls may be used as a simple means to obtain a small total cross sectional area of all openings and thereby a higher resistance.

Figure 8:
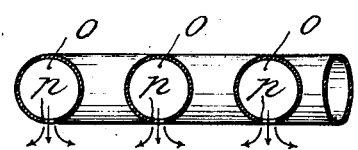

Instead of taking up the vertical impulse of the several jets by means of plates $g$ as indicated on Figs. 4 and 5, the liquid may also be supplied through a spiral tube $o$ with downwardly directed jet openings $p$ as indicated on Fig. 8. Here the jets are directed from above against unperforated bottom $r$. In this form also a layer of granules as indicated on Fig. 6 may of course be utilized for distributing the current of liquid still more evenly.

In drafting the principal claim hereinafter appearing, it is to be understood that it the claim cannot and is not intended to include the arrangements already known having only one hole in the general meaning of the word, i. e. having one round or polygonal hole, and, on the other hand, that the claim intends to include a long narrow, spiral-shaped or serpentine opening which may replace a series of holes distributed over the whole bottom.

Claims:

1. Suspension vessel of the kind wherein a layer of material located above a perforated bottom within the vessel is maintained in suspension in a liquid passing through the perforations of the said bottom, characterized by this that through the bottom at least one vertical section showing more than two perforations can be laid and further that the ratio of cross sectional areas S/F is less than $$\frac{1}{5 - \frac{b}{1} + \frac{a-3}{7}},$$

wherein S means the cross section of a hole with a circular cross section and with well rounded edges and having the same resistance to the current as the perforations of the bottom, further F means the greatest cross section of the suspension compartment perpendicularly to the current direction, $b$ means the average width, 1 means the average length of the cross sections of the perforations measured where the latter have their least cross section, and $a$ means the average distance between these perforations in cm. measured from longitudinal axis to longitudinal axis.

2. Suspension vessel in accordance with claim 1, characterized by a great and rapid diverging of the perforations.

3. Suspension vessel in accordance with claim 1, in which hoods are arranged above the several perforations.

4. Suspension vessel in accordance with claim 1, in which the perforated bottom is formed by a layer of movable solid bodies heavier than the liquid and prevented from sinking by means of a perforated bottom plate.

5. Suspension vessel in accordance with claim 1 in which the perforated bottom is formed by a layer of movable solid bodies heavier than the liquid and prevented from sinking by means of a perforated bottom plate, and in which hoods are arranged above the perforations in said bottom plate.

In testimony that I claim the foregoing as my invention, I have signed my name.

ISAK ISAACHSEN.